Feb. 11, 1969     T. W. TRENDOWSKI     3,426,822

TIRE STUD

Filed Dec. 1, 1966

INVENTOR
THOMAS W. TRENDOWSKI

BY *Harold J. Holt*
ATTORNEY

United States Patent Office 3,426,822
Patented Feb. 11, 1969

3,426,822
TIRE STUD
Thomas William Trendowski, Detroit, Mich., assignor to General Electric Company, a corporation of New York
Filed Dec. 1, 1966, Ser. No. 598,338
U.S. Cl. 152—210            2 Claims
Int. Cl. B60c 11/16

ABSTRACT OF THE DISCLOSURE

A traction-increasing tire stud, for embedding in the peripheral surface of a rubber-like vehicle tire, having a head with a configured cross-section so that the rubber displaced by and surrounding the head applies to it compressive forces in all directions, i.e., radially and axially inwardly and outwardly, to thereby stabilize and hold the stud against excessive movement relative to the tire.

Background of the invention

This invention relates to an anti-skid device for embedding in the tread of a vehicle tire.

In order to increase traction, particularly on ice, rubber-like vehicle tires have been provided with embedded studs. These studs have been formed in the shape of a cylindrical shank, having a head integral with one end and a hard, wear-resistant material extending out of the other end for engaging the road. It is desirable that the studs be mounted in the tires with an optimum amount of stability. Prior art studs have tended to create excessive wear or damage in the recesses of the tires in which they are mounted as a result of excessive movement. On the other hand, such studs must retain some degree of flexibility under operating conditions to prevent stud breakage problems.

It is an object of this invention to provide a tire stud having an improved head design which is formed in a unique configuration so that the rubber-like material surrounding it resiliently exerts forces in all directions upon the head, to thereby stabilize and hold the tire stud against excessive movement and against the tendency to fall out of the tire while retaining sufficient flexibility to avoid breakage.

Summary

The invention herein contemplates forming the tire stud with an enlarged head tapering from and integral with the shank, and having an outer rounded rim with a relatively generous radius, the free end of the head having multiple levels and an annular bead thereon which cooperate together to displace the rubber-like material of the tire upon insertion therein, and to thereby receive the resilient compressive forces of the displaced rubber material surrounding the head, to stabilize the stud against excessive movement relative to the tire.

Brief description of the drawing

These and other objects and advantages of this invention will become apparent upon reading the following description, of which the attached drawings form a part. In these drawings.

Description of the preferred embodiment

Figure 1:
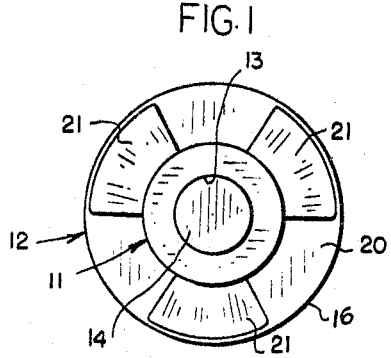
FIGURE 1 is a top plan view of the tire stud herein.
Figure 2:
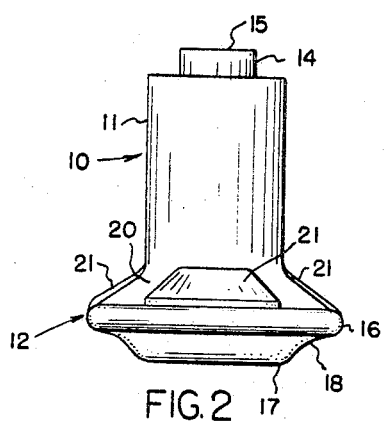
FIGURE 2 is an elevational view of the tire stud.
Figure 3:
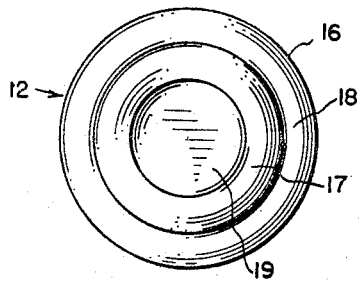
FIGURE 3 is a view of the bottom or base portion of the stud, looking upwardly.
Figure 4:
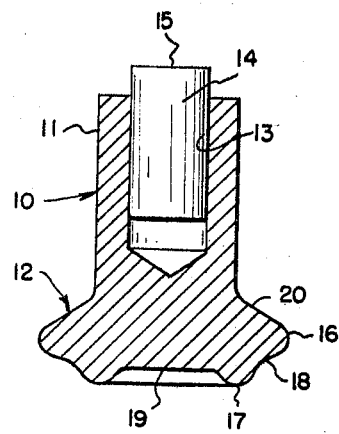
FIGURE 4 is a cross-sectional elevational view of the tire stud.

The tire stud 10 generally comprises a shank 11, preferably of a ductile metal, having an enlarged head 12 integral with one end thereof. The opposite end of the shank 11 is provided with a central bore 13 within which is placed a hard, wear-resistant insert 14 having a road-contacting end 15. The insert may be formed of cemented tungsten carbide or other of the available hard carbide materials. Preferably, the insert is secured within the bore frictionally by means of an interference fit caused by properly dimensioning the bore relative to the diameter of the rod-like insert. However, conventional brazing or other mechanical fastening means may likewise be used.

The novelty herein relates to the head configuration, described as follows:

The head is formed with a rounded, outer rim 16 having a full radius relative to the cross-sectional geometry of the rim and a rounded, annular-shaped, raised bead 17 with the portion between the bead and rim defining an outer discrete surface 18 at a level different than that of bead 17. The portion of the free end of the head, which is surrounded by the raised bead 17, is preferably substantially flat and normal to the axis of the stud to form an end surface 19. In effect, the free end of the head comprises two substantially flat surfaces 18 and 19 offset from each other and from the raised bead 17 which separates the two surfaces.

Between the outer rim 16 and the shank 11, the head is formed tapered or truncated conical in cross-section to define an outward tapered face 20 upon which are formed integral, radially extending, wide bosses 21. The angle of taper ranges from 15 to 25° with a plane perpendicular to the axis of the tire stud.

Figure 5:
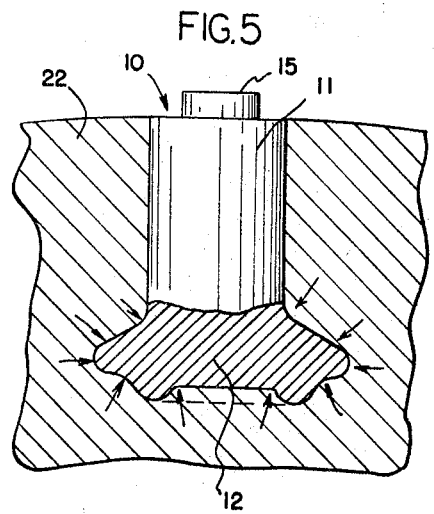
FIGURE 5 illustrates the tire stud mounted within a portion of a rubber tire.

The stud described above is relatively small in size, such as approximately one-half inch in overall height and a head diameter of approximately three-eighths of an inch. The dimensions may of course vary considerably within the foregoing description. A large number of these studs would be used with a single tire in the following manner:

A large number of holes are bored or otherwise formed in the peripheral traction face of the tire, with the holes being somewhat smaller than the diameter of the shank. Then, a stud is forced into each hole, as shown in FIG. 5, so that its head displaces the rubber or rubber-like material of the tire. The displaced tire material surrounding the head then exerts a compressive force upon the configured head 12, and as indicated by the arrows in FIG. 5, these compressive forces are in substantially all directions, and are each counterbalanced one by another. There are also compressive forces, not shown, against the shank. The forces against the head are exerted radially and axially in such fashion that they maintain the stud in the tire and, in addition, stabilize the stud against excessive movement relative to the tire. During movement of the tire, as well as in striking various objects, the stud can move to some extent relative to the tire or with the tire, but its movement is restrained by counterbalanced compressive forces around the head and is almost immediately stabilized into its proper position. In addition, the rounded outer rim 16 has been found to provide stability without cutting the tire recess, as is the case with a relatively sharp edge on prior art studs.

When embedded in the tire, as indicated in FIG. 5, wherein the tire fragment 22 is shown, the road-contacting edge 15 of the carbide insert 14 is exposed, as is conventional. As the tire wears, the carbide also wears to some extent and the same relative extension beyond the tire surface is generally maintained.

I claim:

1. In a tire stud, for embedding in the peripheral edge of a rubber-like vehicle tire, and formed of a shank having a road-contacting end and an enlarged head formed upon its opposite end, the improvement comprising;

said head having a fully rounded outer edge rim;

a rounded, annular-shaped, raised bead, of lesser diameter than said rim, formed upon the free end of the head, the portion of the free end of the head surrounded by said bead being substantially flat and normal to the axis of the shank;

the head portion between the rim and the bead defining a discrete surface upon the free end of the head at a different level than the bead;

and the head portion between said rim and the shank being tapered in cross section;

whereby, the rubber-like material surrounding and displaced by said head, when it is embedded in a tire, resiliently exerts radially and axially inwardly and outwardly compressive forces upon said head for thereby stabilizing the stud again excessive movement relative to the tire.

2. In a tire stud as defined in claim 1, and including wide, radially directed, raised bosses, formed upon said tapered head portion for interlocking with the rubber and thus further resisting movement of the stud.

References Cited

UNITED STATES PATENTS

| | | | |
|---|---|---|---|
| 3,186,466 | 6/1965 | Keinanen | 152—210 |
| 3,230,997 | 1/1966 | Carlstedt | 152—210 |
| 3,301,300 | 1/1967 | Natter | 152—210 |
| 3,363,658 | 1/1968 | Coubrough | 152—211 |

FOREIGN PATENTS

| | | |
|---|---|---|
| 204,598 | 5/1966 | Sweden. |
| 1,419,090 | 10/1965 | France. |

ARTHUR L. LA POINT, *Primary Examiner.*

C. B. LYON, *Assistant Examiner.*